Patented Feb. 2, 1954

2,668,173

UNITED STATES PATENT OFFICE 2,668,173

TREATMENT OF ACIDIC MIXTURES AND PRODUCTS RESULTING THEREFROM

Carl N. Zellner, New Providence, and Fred Lister, Elizabeth, N. J., assignors to Tide Water Associated Oil Company, Bayonne, N. J., a corporation of Delaware No Drawing. Application March 11, 1950, Serial No. 149,218

15 Claims. (Cl. 260—452)

The present invention relates to the treatment of acidic compositions obtained from partially oxidized hydrocarbon mixtures as described hereinafter, to obtain therefrom increased yields of desired acidic products.

In the preparation of partially oxidized hydrocarbon mixtures by reacting hydrocarbons with oxidizing agents under controlled oxidizing conditions, crude oxidized hydrocarbon mixtures are obtained that comprise a wide variety of oxidized products, the exact nature of which appears to be primarily dependent upon the particular conditions employed for effecting the oxidation. For example, the art is aware of numerous disclosures relating to oxidation of suitable hydrocarbons for preparation of acidic oxidized mixtures that possess relatively low saponification values and contain a substantial amount of monobasic acids with a negligible amount, if any, of substances such as crystalline polybasic acids. On the other hand, the art is aware of the preparation of acidic oxidized hydrocarbon mixtures that possess relatively high saponification values (e. g., at least about 400 mgs. of KOH per gram or more, such as on the order of 500 to 625 and even higher) and contain a substantial amount of polyfunctional acidic substances including crystalline dibasic acids. In illustration thereof, reference is made herein to U. S. Patent No. 2,486,454 disclosing such compositions and a controlled process for making the same comprising oxidation of suitable hydrocarbon mixtures in liquid phase by reaction thereof with oxygen of a free oxygen containing gas to prepare crude oxidized hydrocarbon mixtures which may possess saponification values of at least 400, have a substantial difference between acid and saponification values, and contain a substantial amount of polybasic acidic substances including crystalline dibasic acids.

As those skilled in the art are also aware, crude oxidized hydrocarbon mixtures may be employed to good advantage for certain requirements without further refinement whereas, for other purposes, it is desirable to separate at least some of the constituents of such crude mixtures from other constituents thereof in order to obtain a product or products of particular utility and/or to increase the economic yield of the oxidation process. With particular reference to hydrocarbon mixtures oxidized to relatively high saponification values as aforesaid, such mixtures represent a valuable source of highly desirable acidic substances, particularly acidic substances of the polybasic type, that have enhanced utility for many purposes. In particular, such crude oxidized mixtures represent a valuable source of acidic substances having at least two saponifiable groups per molecule and of enhanced utility for preparation of high boiling, high molecular weight esters useful as plasticizers for various synthetic resins and as intermediates for preparation of various other organic compounds. Although crude oxidized hydrocarbon mixtures having relatively high saponification values contain a substantial amount of the aforesaid desired acidic substances, such crude mixtures usually contain along therewith acidic constituents that have a lower than desired value with respect to the number of saponifiable groups per molecule as well as lower than desired molecular weight and boiling point characteristics. For many purposes, it is highly desired to obtain from such crude oxidized mixtures, and especially at the expense of acidic constituents that possess lower than desired values for the aforesaid characteristics, an increased yield of acidic substances that have increased values with respect to the number of saponifiable groups per molecule, boiling point, and molecular weight characteristics. For example, in contemplated usage of acidic components of such crude oxidized hydrocarbon mixtures for preparation of esters or other compounds based on polybasic acids, the obtainment of the aforesaid desired acidic substances in increased yield markedly enhances the economic aspect of the oxidation process and provides increased yields of highly useful acidic products. As is apparent from the disclosure set forth hereinafter, a prime object of the present invention is to provide the art with a process that enables obtainment, from oxidized hydrocarbon mixtures as aforesaid, of an increased yield of high molecular weight, high boiling point acidic substances having an increased number of saponifiable groups per molecule at the expense of acidic consitutents of such crude mixtures that possess lower than desired values for such characteristics.

Broadly speaking, the starting materials contemplated for use in practice of this invention are acidic fractions, and preferably selected distillates, obtained from crude oxidized hydrocarbon mixtures prepared by partial oxidation of hydrocarbon mixtures to the extent that the oxidized mixtures contain a substantial amount of polybasic acids in admixture with acidic substances of the monobasic type. The present invention is based on the discovery that acidic fractions obtainable from such hydrocarbon mixtures and containing acidic components of the monobasic type may, upon treatment as defined hereinafter, be converted to more highly desired acidic mixtures having an increased number of saponifiable groups per molecule, along with increased molecular weight and boiling point range characteristics, as compared to the acidic fraction subjected to treatment. More specifically, suitable fractions for use as starting materials in practice of this invention are acidic fractions, obtained from crude oxidized hydrocarbon mixtures as aforesaid, containing a substantial, and preferably a predominant, amount of an acidic mixture having an average of not more than about two saponifiable groups per molecule. In a specific embodiment, suitable acidic fractions for use as starting materials in practice of this invention may be obtained from hydrocarbon mixtures oxidized to a saponification value of at least about 400 or more, and more specifically, acidic fractions obtainable by distillation of a crude oxidized hydrocarbon mixture having a saponification value of at least about 400, further characterized by having a substantial difference between acid and saponification value, and prepared by reaction of a hydrocarbon mixture in liquid phase with oxygen of a free oxygen containing gas. In illustration, particularly suitable starting materials for practice of this invention are acidic distillates obtained from crude oxidized hydrocarbon mixtures disclosed in and prepared by the controlled process of the aforesaid U. S. Patent No. 2,436,454, the disclosure of which is incorporated herein by reference, relating to partial oxidation of predominantly paraffinic hydrocarbons in liquid phase by contacting such a mixture with a free oxygen containing gas under controlled conditions to cause combination of oxygen with the hydrocarbon mixture at an average rate related to the oxidizing temperature as follows: substantially above 1.5 liters of oxygen per hour per kilogram of hydrocarbons at an oxidizing temperature of 120° C., substantially above 23 liters of oxygen per hour per kilogram of hydrocarbons at an oxidizing temperature of 160° C., and substantial above 135 liters of oxygen per hour per kilogram of hydrocarbons at an oxidizing temperature of 180° C. Although in certain instances all or substantially all of the acidic distillate obtainable from oxidized mixtures as defined hereinbefore may be subjected to treatment as disclosed hereinafter, a preferred aspect of the invention is to subject to such treatment a selected portion or portions of such distillates. In illustration, crude oxidized hydrocarbon mixtures oxidized to the extent that they contain a substantial amount of polybasic acids also contain, in distillates obtainable therefrom, acidic substances of desired characteristics along with acidic substances having lower than desired values with respect to the number of saponifiable groups per molecule, boiling point range and molecular weight characteristics. Since an important aspect of this invention is to convert acidic substances of the latter type to acidic products having increased values with respect to the aforesaid characteristics, preferred practice of this invention is to subject to treatment as defined hereinafter a selected portion of a distillate obtainable from the crude oxidized mixtures, said selected portion being characterized by containing, preferably in predominant amount, acidic substances having lower than desired values with respect to the aforesaid characteristics. Although such selected fractions may be obtained by various means, suitable means include distilling the crude oxidized hydrocarbon mixture to obtain all or substantially all of the distillable constituents thereof and segregating a desired selected portion thereof, or partially distilling the crude oxidized hydrocarbon mixture to obtain only a desired selected distillate portion. In one embodiment, a suitable selected fraction for practicing this invention may comprise an acidic distillate that contains a substantial, and preferably a predominant amount, of an acidic mixture averaging not more than about two saponifiable groups per molecule, e. g., averaging from about one to about two saponifiable groups per molecule. In another embodiment, a suitable selected fraction for practicing this invention may comprise wholly, or in predominant amount, the lower boiling portion of the distillate obtainable from crude oxidized hydrocarbon mixtures as aforesaid. Thus, in certain instances such selected fractions may comprise the portion of the distillate boiling up to about 150° C. at 0.1 to 0.2 mm. pressure, or up to about 170° C. at such a pressure, or lower boiling portions boiling at other than the above selected temperatures. In particularly practical aspect, a selected fraction may usually comprise the lower boiling portion of the distillate obtainable from crude oxidized mixtures as aforedescribed, as for example, a fraction comprising wholly or predominantly the lower boiling half by weight of the distillate obtainable from the crude oxidized hydrocarbon mixture.

In accordance with this invention, a suitable acidic fraction as aforediscussed is subjected to a controlled heat treatment to effect conversion of a substantial portion of the acidic constituents thereof that possess lower than desired characteristics with respect to number of saponifiable groups per molecule, molecular weight, and boiling point range to acidic substances of increased values with respect to such characteristics. The acidic fraction per se or selected portion thereof, may be subjected to the heat treatment or, if desired, may be heat treated in the presence of an aqueous medium such as by admixing water with the acidic fraction and subjecting the mixture to the controlled heat treatment. The temperature and time of treatment employed may be varied over rather wide ranges depending upon factors such as the particular acidic fraction employed, the extent of conversion desired, etc. but for highly suitable practice of the invention, the temperature used is such that it does not exceed and preferably is below that sufficient to effect substantial, if any, decomposition of the fraction under treatment. For most purposes, a temperature not in excess of about 275° C. is employed, although it should be understood that somewhat higher temperatures may be used with suitable results upon treatment of particular acidic fractions. Thus, and in specific embodiment, temperatures of about 100 to 250° C. may be used and still more specifically about 130 to 200° C. for particular desired results. In further specific embodiment, the heat treatment may be carried out by use of an initial temperature at the lower end of the aforesaid range or lower, e. g., at about 80° C. with completion of the treatment at the higher end of the aforesaid temperature range or by progressively increasing the temperature during the treatment. The time period employed for the aforesaid heat treatment may also be varied depending upon the particular temperature employed, the particular acidic fraction under treatment, etc., but for purposes of illustrating suitable conditions with respect to practice of this invention without intent of limitation thereto, a heat treatment of about one to about eight hours or more may be used although in most instances about two to about six hours will usually be sufficient. In specific embodiment, time-temperature conditions that may be used include treatment for about three hours at temperatures ranging from about 100 to 200° C.; an initial heating at 100° C. for about one hour and increasing the temperature to about 200° C. over a period of about three hours; and an initial heat treatment at a low temperature, e. g., 80° C. to 100° C. for about one-half hour and increasing the temperature up to about 150° C. or higher, e. g., 200° C., over a period of about three hours, and the like. As aforesaid, however, such conditions are set forth for illustrative and not limitative purposes as it will readily be apparent to those skilled in the art that the optimum conditions for treatment of the particular acidic fractions of the type contemplated herein may be varied from the foregoing illustrative time-temperature conditions.

In order to further describe the invention, the following examples set forth specific embodiments chosen for illustrative purposes without intention of limitation.

Example I

A crude oxidized hydrocarbon mixture, having an acid value of 398, a saponification value of 542 and prepared by air-blowing of a 105 to 108° F. melting point hydrocarbon scale wax in liquid phase in accordance with the process disclosed in U. S. Patent No. 2,486,454, was subjected to distillation and, of the distillate obtained, the portion thereof boiling between 100 to 150° C. at 0.1 to 0.2 mm. pressure possessed the following properties:

| | |
|---|---|
| Molecular weight | 163 |
| Acid value | 398 |
| Saponification value | 532 |
| Average number of saponifiable groups per molecule | 1.54 |
| Bromine number (ASTM), milliequivalents per gram | 0.22 |
| Solubility in n-heptane at 60° C., per cent | 18 |

The aforesaid 100 to 150° C. boiling point fraction was heated for two hours at 100 to 150° C. and for three hours at 180 to 201° C. and upon analysis, the thus-treated fraction had a bromine value of 0.35 milliequivalent per gram and a solubility of 18.4% by weight in n-heptane. Based upon the weight of the 100 to 150° C. fraction subjected to the aforesaid treatment, 49% thereof was converted by the aforesaid treatment to an acidic mixture boiling over 150° C. at 0.1 to 0.2 mm. pressure. Of the acidic mixture obtained and boiling over 150° C. approximately 60% by weight thereof boiled over 170° C. at 0.2 to 0.3 mm. pressure and possessed the following properties:

| | |
|---|---|
| Molecular weight | 242 |
| Acid value | 390 |
| Saponification value | 578 |
| Average number of saponifiable groups per molecule | 2.49 |
| Bromine number (ASTM), milliequivalents per gram | 0.56 |
| Solubility in n-heptane at 60° C., per cent (by weight) | 18 |

Example II

A crude oxidized hydrocarbon mixture having an acid value of 403, a saponification value of 594 and prepared by air-blowing a scale wax in liquid phase in accordance with the process disclosed in U. S. Patent No. 2,486,454 was subjected to distillation using a still temperature of 350° C. at 1 to 2 mm. pressure. Of the distillate obtained, the portion thereof boiling below 170° C. at 0.1 to 0.2 mm. pressure had the following properties:

| | |
|---|---|
| Molecular weight | 176 |
| Acid value | 426 |
| Saponification value | 571 |
| Average number of saponifiable groups per molecule | 1.8 |
| Bromine number (ASTM), milliequivalents per gram | 0.5 |
| Solubility in n-heptane at 60° C., per cent (by weight) | 18.8 |

In accordance with this invention, the aforesaid selected portion of the distillate was mixed with water in a weight ratio of 2 parts of distillate to one part of water. The resulting mixture was heated at 100° C. for two hours and at 174 to 205° C. for 4½ hours in a 3-neck distillation flask equipped with a stirrer, a Dean trap, and a thermometer. The heat treated product had a bromine number of 0.5 milliequivalents per gram and a solubility of 18.8% by weight in n-heptane. Whereas the untreated distillate fraction had a boiling point range below 170° C. at 0.1 to 0.2 mm. and an average number of saponifiable groups per molecule of 1.8, the aforesaid heat treatment converted 21% by weight of the distillate to a non-resinous acidic mixture boiling over 170° C. at 0.1 to 0.2 mm. pressure and possessing the following properties:

| | |
|---|---|
| Molecular weight | 312 |
| Acid value | 375 |
| Saponification value | 577 |
| Average number of saponifiable groups per molecule | 3.21 |
| Bromine number, milliequivalents per gram | 0.65 |
| Solubility in n-heptane at 60° C., per cent (by weight) | 13.8 |

As is apparent from the foregoing illustrative embodiments of this invention, treatment of acidic fractions obtainable from crude oxidized hydrocarbon mixtures as aforedescribed in accordance with this invention effectively converts a substantial amount of acidic constituents of such mixtures that have lower than desired values with respect to the number of saponifiable groups per molecule, boiling point and molecular weight characteristics to acidic substances of increased values with respect to such characteristics. That such a desirable conversion can be effected by a treatment as disclosed herein is, insofar as we are aware, an unexpected advantageous result and is particularly so when it is considered that, as evidenced by the aforesaid illustrative examples, the treatment effectively produced the desired results even though the acidic fractions subjected to treatment were substantially devoid of an unsaturation value and the desired products obtained by treatment thereof in accordance with this invention were not substantially, if at all, increased in unsaturation values and possessed substantially the same or lower solubility characteristics in n-heptane than the acidic fractions from which they were obtained.

As is apparent from the foregoing description of this invention, the desired products are acidic mixtures having increased values with respect to average number of saponifiable groups per molecule, boiling point and molecular weight characteristics prepared at the expense of acidic constituents that have lower than desired values with respect to such characteristics. Thus, and in particular reference to the use of acidic fractions as embodied herein and which contain a substantial amount of an acidic mixture having an average number of saponifiable groups per molecule of not more than about two, the present invention embodies treatment thereof as aforedescribed for conversion of a substantial amount of said acidic mixture to a non-resinous acidic mixture that possesses an average of more than two saponifiable groups per molecule, e. g., more than two and up to about four saponifiable groups per molecule, and has higher boiling point and molecular weight characteristics than the acidic fraction subjected to the treatment described herein.

Although the present invention has been described in conjunction wtih certain preferred embodiments thereof, those skilled in the art will readily recognize that variations and modifications can be made. Such modifications and variations are to be considered to be within the purview of the specification and scope of the appended claims.

We claim:

1. A method for obtaining substantially increased yields of polybasic acidic substances from a hydrocarbon mixture oxidized to the extent of containing polybasic acids in admixture with acidic substances of the monobasic type, said mixture being characterized by having a saponification value of at least 400 and a substantial difference between acid and saponification value, which comprises separating from said mixture an acidic fraction comprised predominantly of a low boiling portion of material distillable from said mixture, and heating said acidic fraction at an elevated temperature but below a temperature sufficient to substantially decompose said acidic fraction for an extended period of time sufficient to convert a substantial amount of said acidic fraction to acidic substances having an increased average number of saponifiable groups per molecule, a higher boiling point and a higher molecular weight than said acidic fraction, said acidic fraction being characterized by having (a) a saponification value of at least 400, (b) a substantial difference between acid and saponification value, and (c) an acid value that accounts for a substantial part of the saponification value.

2. As a new composition, an acidic mixture prepared by the method of claim 1 from the low boiling acidic fraction defined therein, said acidic mixture being characterized by having an increased average number of saponifiable groups per molecule, a higher boiling point and a higher molecular weight as compared to the acidic low boiling fraction subjected to the defined heat treatment of claim 1.

3. A method, as defined in claim 1, wherein the acidic fraction is obtained by distillation of the defined oxidized hydrocarbon mixture.

4. A method, as defined in claim 1, wherein the oxidized hydrocarbon mixture is prepared by liquid phase oxidation of a hydrocarbon mixture with a free oxygen containing gas.

5. A method, as defined in claim 1, wherein the oxidized hydrocarbon mixture is prepared by oxidation of a predominantly paraffinic hydrocarbon mixture in liquid phase with a free oxygen containing gas under oxidizing conditions sufficient to cause combination of oxygen with said hydrocarbon mixture at an average rate related to the oxidizing temperature as follows: substantially above 1.5 liters of oxygen per hour per kilogram of hydrocarbons at an oxidizing temperature of 120° C., substantially above 23 liters of oxygen per hour per kilogram of hydrocarbons at an oxidizing temperature of 160° C., and substantially above 135 liters of oxygen per hour per kilogram of hydrocarbons at an oxidizing temperature of 180° C.

6. A method for obtaining increased yields of polybasic acidic substances from hydrocarbon mixtures oxidized to the extent of containing polybasic acids in admixture with acidic substances of the monofunctional type, said oxidized mixtures being characterized by having a saponification value of at least about 400 and a substantial difference between acid and saponification values which comprises flash distilling said oxidized hydrocarbon and heating a low boiling fraction of the resulting distillate at an elevated temperature but below a temperature sufficient to substantially decompose said fraction for a period of time sufficient to convert a substantial portion of said fraction to acidic substances having a higher boiling point and an increased average number of saponifiable groups per molecule as compared to said low boiling fraction, said low boiling fraction being characterized by having a saponification value of at least about 400 and a substantial difference between acid and saponification values.

7. A method, as defined in claim 6, wherein the crude oxidized hydrocarbon mixture has been prepared by liquid phase oxidation of a hydrocarbon mixture with a free oxygen-containing gas.

8. As a new composition, an acidic mixture averaging more than about two and up to about four saponifiable groups per molecule, said mixture having been prepared by the method of claim 6 from the low boiling fraction defined therein and characterized by having an increased average number of saponifiable groups per molecule and a higher molecular weight as compared to the low boiling fraction subjected to the defined treatment.

9. A method, as defined in claim 6, wherein the low boiling fraction has a boiling point not exceeding about 170° C. at about 0.1 to about 0.2 mm. pressure.

10. A method, as defined in claim 6, wherein the low boiling fraction has an average of more than one but less than two saponifiable groups per molecule.

11. A method for obtaining increased yields of polybasic acidic substances from hydrocarbon mixtures oxidized to the extent of containing polybasic acids in admixture with acidic substances of the monobasic type, said mixtures being characterized by having a saponification value of at least about 400, a substantial difference between acid and saponification value, and prepared by liquid phase oxidation of a predominantly paraffinic hydrocarbon mixture with a free oxygen-containing gas which comprises heating at from about 80° C. to about 275° C. for about two to about eight hours a low boiling portion of material distillable from said oxidized hydrocarbon mixture to convert a substantial amount of said low boiling portion to acidic substances having a higher boiling point, an increased average number of saponifiable groups per molecule and higher molecular weight than said low boiling portion, said low boiling portion being characterized by having a saponification value of at least about 400, a substantial difference between acid and saponification value and an average of more than one but less than two saponifiable groups per molecule.

12. A method, as defined in claim 11, wherein the low boiling portion is obtained by distillation of the oxidized hydrocarbon mixture.

13. A method, as defined in claim 11, wherein the low boiling portion is comprised predominantly of acidic substances boiling below about 170° C. at about 0.1 to about 0.2 mm. pressure.

14. A method, as defined in claim 11, wherein the low boiling portion is comprised predominantly of acidic substances boiling below about 150° C. at about 0.1 to about 0.2 mm. pressure.

15. As a new composition, an acidic substantially non-resinous mixture prepared by the method of claim 11, from the low boiling portion defined therein, said substantially non-resinous mixture being characterized by having an increased average number of saponifiable groups per molecule and a higher molecular weight as compared to the low boiling portion subjected to the defined treatment.

CARL N. ZELLNER.
FRED LISTER.

References Cited in the file of this patent

UNITED STATES PATENTS

| Number | Name | Date |
|---|---|---|
| 1,940,400 | Dietrich | Dec. 19, 1933 |
| 1,965,961 | Luther et al. | July 10, 1934 |
| 2,486,454 | Zellner | Nov. 1, 1949 |
| 2,486,455 | Zellner | Nov. 1, 1949 |